Figure 1:
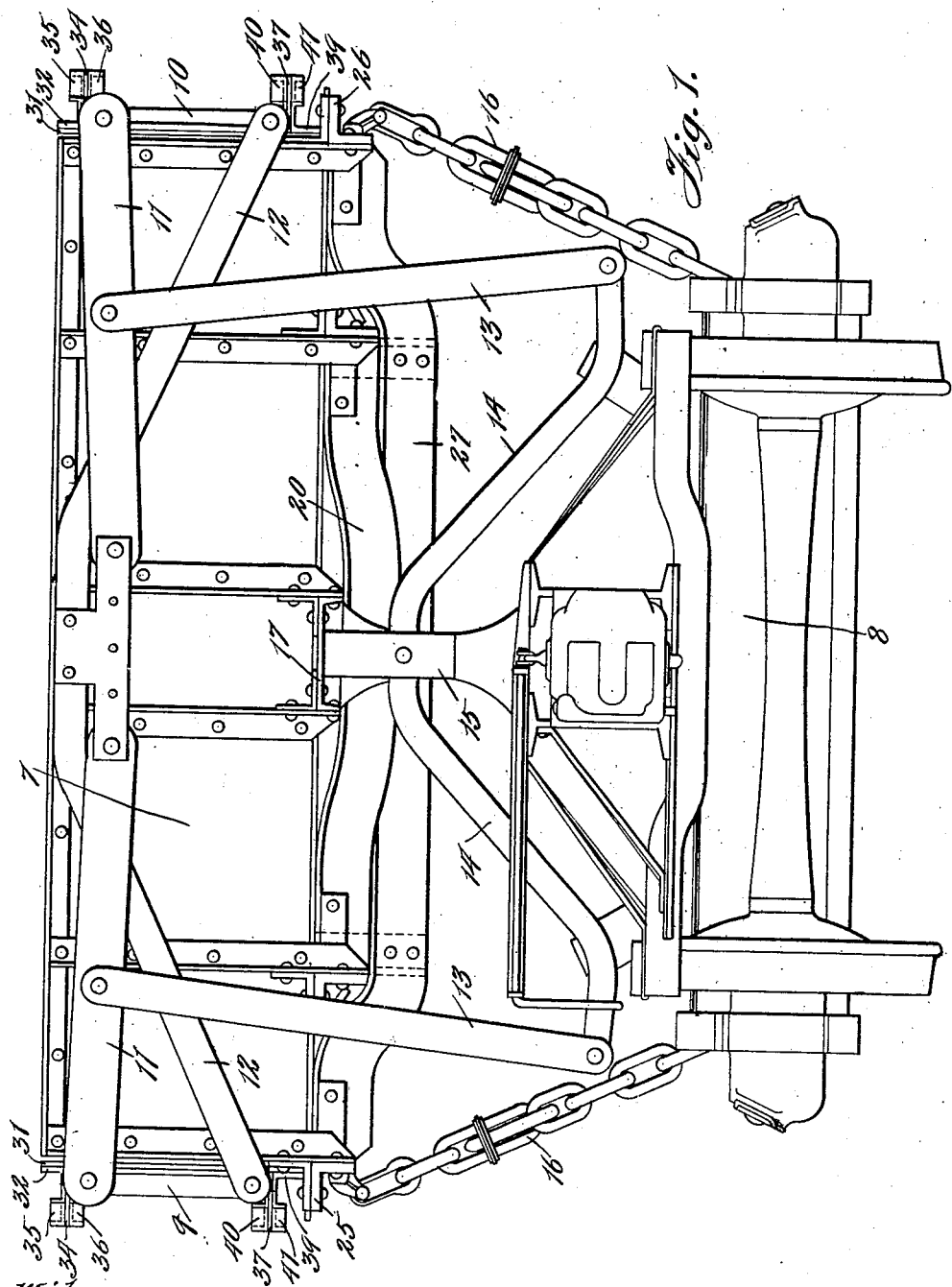

No. 873,772. PATENTED DEC. 17, 1907.
T. R. McKNIGHT.
DUMP CAR.
APPLICATION FILED SEPT. 26, 1907.

3 SHEETS—SHEET 1.

Witnesses:

Inventor:
Thomas R. McKnight.

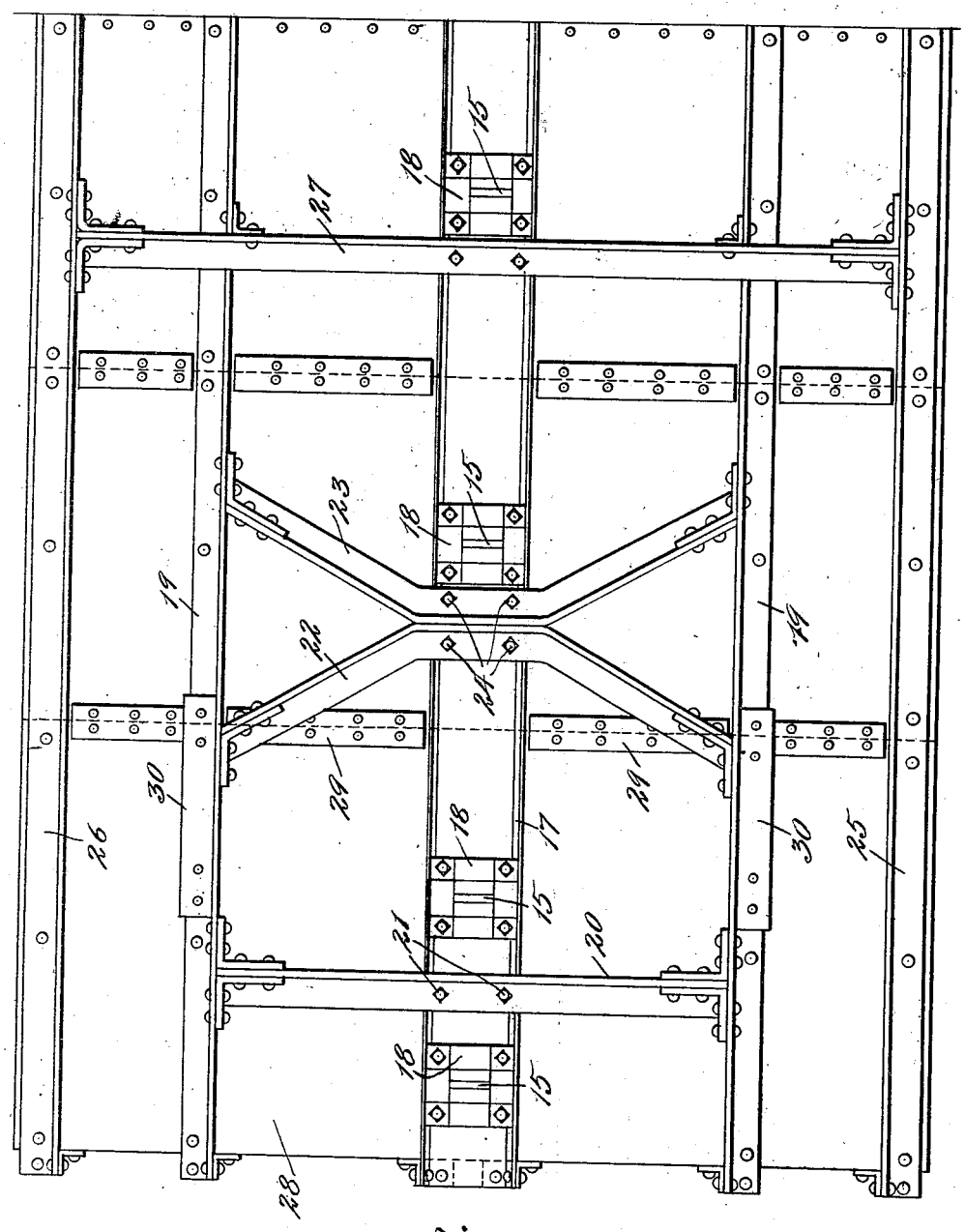

No. 873,772.
PATENTED DEC. 17, 1907.
T. R. McKNIGHT.
DUMP CAR.
APPLICATION FILED SEPT. 26, 1907.
3 SHEETS—SHEET 3.
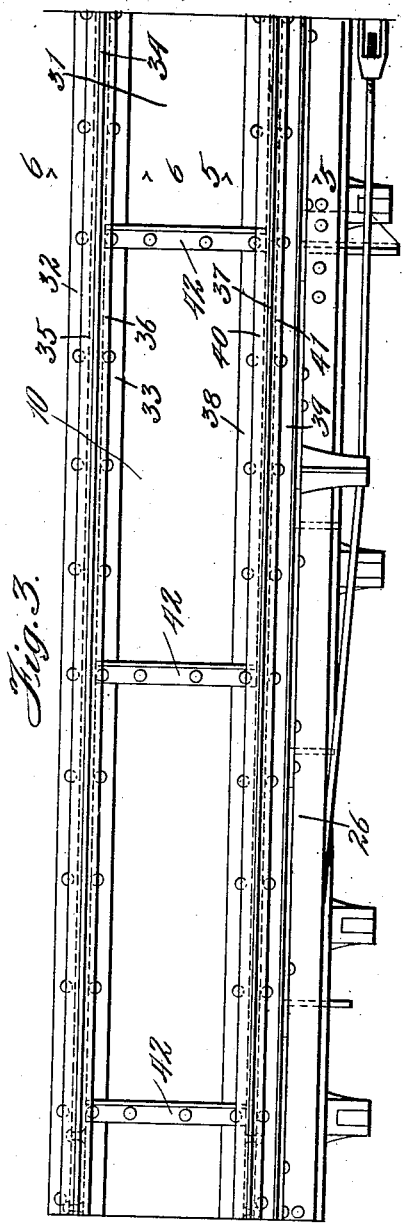
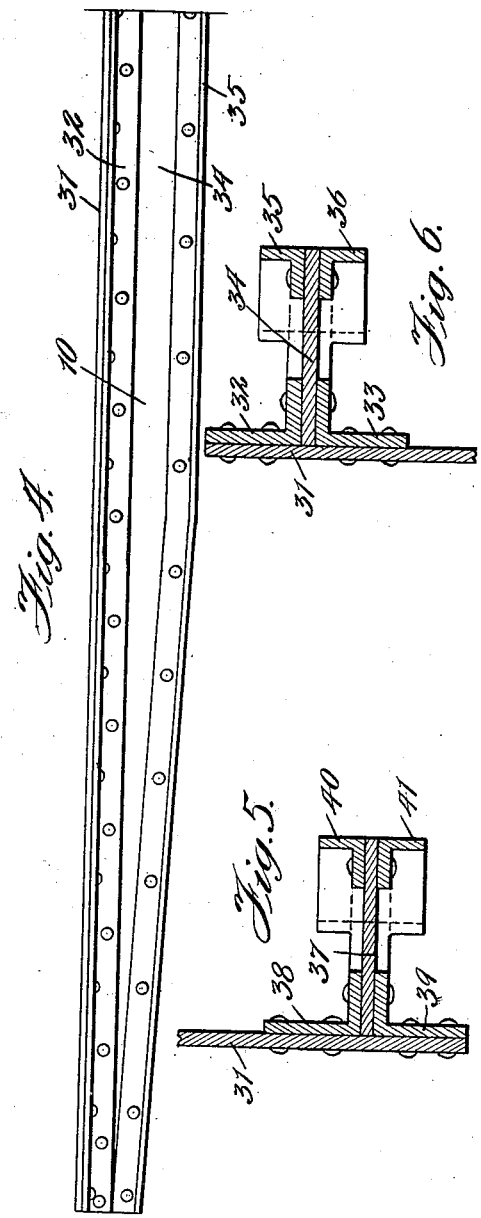
Witnesses:
Inventor:
Thomas R. McKnight,

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

No. 873,772.　　　　Specification of Letters Patent.　　Patented Dec. 17, 1907.

Application filed September 26, 1907. Serial No. 394,715.

*To all whom it may concern:*

Be it known that I, THOMAS R. McKNIGHT, a citizen of the United States, residing at Aurora, county of Kane, State of Illinois, have invented certain new and useful Improvements in Dump-Cars, of which the following is a specification, reference being had to the accompanying drawings.

My invention relates to dump cars of the type having side doors which are automatically raised when the car is tilted to one side or the other so as to open up the whole side of the car for the discharge of the load. In cars of this type, the entire load is supported by the floor of the car, making it necessary that the floor be made very strong so as to be capable not only of adequately sustaining the load but also of resisting the twisting and racking strains to which it is subjected in the operation of the car. For example, if the load is not uniformly distributed over the floor of the car, there is more or less of a torsion strain upon the car body, and particularly so when the load is being dumped. Furthermore, in cars of this type, the side gates or doors of the car can be connected to the car body only at their ends. Consequently it is necessary to make the doors or sides very strong to resist the strains to which the intermediate portions thereof are subjected.

My present invention has for its object to provide an improved construction of dump car in which the objections above noted are avoided, and a car produced the floor of which will be thoroughly braced so as to enable it to successfully resist the various strains to which it is subjected; also to provide a door of which the intermediate portion will be very strongly braced so that it will not yield or spring under the weight of the load. I accomplish this object by the means shown in the drawings and hereinafter specifically described.

That which I believe to be new will be pointed out in the claims.

In the drawings:—Figure 1 is an end view of my improved car; Fig. 2 is an under side plan view of one-half of the bottom of the car; Fig. 3 is a side view of one-half of the car-body; Fig. 4 is a plan view of one-half of one of the sides; Fig. 5 is a section on line 5—5 of Fig. 3; and Fig. 6 is a section on line 6—6 of Fig. 3.

Referring to the drawings, 7 indicates a car-body, and 8 the truck on which it is mounted.

9—10 indicate the side gates or doors, which, as shown in Fig. 1, are pivotally connected at their ends with the ends of the car by arms 11—12. Bars 13 connected to the arms 11 and to bars 14 serve to cause the doors to rise out of operative position when the car body is tilted to one side or the other. The car body is pivotally supported on the truck by means of supports 15 arranged centrally under the car body so that the load may be dumped at either side of the car.

16 indicates the usual side chains by which the car body is held in its horizontal or normal position when the load is being transported. These features form no part of my present invention and as the construction is well understood by those familiar with the art they will not be described more in detail herein.

The construction of the bed or platform which forms the floor of the car is best shown in Fig. 2. As therein shown, there is a central longitudinal channel-iron 17 which extends from end to end of the car on the under side thereof, said channel-iron occupying an inverted position, as shown in Fig. 1. To this channel-iron, which forms the center sill of the bed, are secured the pivotal supports 15 in any suitable way, but preferably by means of filler-blocks 18 secured in the channel-iron at the proper points.

19 indicates angle-irons which extend longitudinally of the car between the side edges thereof and the channel-iron 17.

20 indicates angle-irons which extend transversely of the car near the ends thereof and are fixedly secured to the end portions of the angle-irons 19. As shown in Fig. 1, said angle-irons 20 are bent so that they pass immediately under and bear against the flanges of the channel-iron 17, and they are connected thereto by bolts 21.

22—23 indicate braces connected together in the form of an X and having their ends secured to the angle-irons 19, said braces being also bent to extend under the channel-iron 17 to which they also are secured by bolts 24. The braces 22—23 are placed about midway between the center of the car body and the ends thereof, and, together with the braces 20, serve to stiffen and support the central portion of the car platform.

25—26 indicate angle-irons which underlie the side edges of the car platform, as shown in Figs. 1 and 2. Said angle-irons are connected near the longitudinal center of the car by angle-irons 27 which extend transversely of the car body and are rigidly secured not only to the angle-irons 25—26 but also to the angle-irons 19 and to the channel-iron 17 under which they pass, as shown in Figs. 1 and 2. It will thus be seen that the frame of the car platform is thoroughly braced in all directions and is also supported or trussed to sustain the load, the angle-irons 20, 22, 23 and 27 all serving as trusses.

The floor of the car body is made up of metal sheets 28 secured upon the angle-irons which compose the frame, as already described, and connected together by plates 29 riveted to the meeting edges of the several sheets 28.

30 indicates cushion plates of wood or other suitable material secured to the angle-irons 19 in position to strike suitable cushions provided on the truck when the car body is dumped at one side or the other.

The construction of the side doors 9—10 is best shown in Figs. 5 and 6. As therein shown, it will be seen that said doors are composed of plates 31 placed on edge, said plates having oppositely-arranged angle-irons 32—33 and a perpendicularly-arranged plate 34 secured to the outside thereof near their upper edges, as shown in Fig. 6. The angle-irons 32—33 serve to connect the horizontal plate 34 to the upright plate 31. The horizontal plate is also provided, near its outer edge, with angle-irons 35—36, said angle-irons serving to further brace said plate 34. As best shown in Fig. 4, the plate 34 is wider at the central portion of the car than at the ends, being tapered off toward the ends, where the strains to which the door is subjected are not so great. A similar series of supports and braces is provided near the lower edge of the door, as shown in Fig. 5.

It will be seen that the lower margin of the plate 31 is provided with a horizontal plate 37 connected with the door by oppositely-disposed angle-irons 38—39, and also having angle-irons 40—41 near its outer margin. The plate 37 is also tapered toward the ends of the car, in the manner shown in Fig. 4. The door is thus braced most strongly intermediately where the greatest strength is required, and this is accomplished without increasing the weight of the door to an objectionable extent. At intervals the door is provided with vertical angle-irons 42, as shown in Fig. 3, which serve still further to brace and strengthen it.

While the center sill is best made in the form of an inverted channel-iron, the term "channel-iron" as employed in the claims, should be construed not only as meaning a channel-iron proper but also any other suitable structural shape for the center sill of the bed.

What I claim as my invention and desire to secure by Letters Patent is:—

1. A dump car platform comprising a frame formed of a center sill extending longitudinally thereof, said center sill being composed of a channel-iron longitudinal angle-irons at the sides of said center sill, and cross braces connected at their ends with said angle-irons and extending under said center sill, and a floor secured upon said frame.

2. A dump car platform comprising a frame formed of a center sill extending longitudinally thereof, said center sill being composed of a channel-iron longitudinal angle-irons at the sides of said center sill, and cross braces connected at their ends with said angle-iron and extending under said center sill, the cross braces being secured to said center sill, and a floor secured upon said frame.

3. A dump car platform comprising a frame formed of a center sill extending longitudinally thereof, longitudinally-extending angle-irons forming the side edges of said frame, intermediately-disposed angle-irons extending longitudinally of said frame, cross braces connecting said first-mentioned angle-irons, and cross braces connecting said intermediate angle-irons, all of said cross braces extending under said center sill, and a floor secured upon said frame.

4. A dump car platform comprising a frame composed of an inverted channel-iron extending longitudinally at the center thereof, intermediate longitudinally-disposed angle-irons, cross braces connecting said intermediate angle-irons, said braces being secured together in the form of an X and extending under and being secured to said channel-iron, marginal supports for the frame, and cross braces connecting said marginal supports, and floor plates secured to said frame.

5. A dump car comprising a frame having a longitudinally-extending inverted channel-iron arranged centrally thereof, pivotal supports connected to said channel-iron, longitudinally-disposed braces for the side portions of the frame, and cross braces extending under the channel-iron and connected to said longitudinal braces, and a floor secured upon said frame.

6. A dump car comprising a frame having a longitudinally-extending inverted channel-iron arranged centrally thereof, pivotal supports connected to said channel-iron, longitudinally-disposed braces for the side portions of the frame, and cross braces extending under the channel-iron and connected to said longitudinal braces, said cross braces comprising angle-irons secured to said channel-iron, and a floor secured upon said frame.

7. A door for dump cars composed of an upright plate, horizontal plates extending longitudinally near the upper and lower margins thereof, and angle-irons securing said horizontal and upright plates together.

8. A door for dump cars composed of an upright plate, horizontal plates extending longitudinally near the upper and lower margins thereof, said horizontal plates having oppositely-disposed angle-irons secured thereto at their outer margins, and angle-irons securing said horizontal and upright plates together.

9. A door for dump cars composed of an upright plate, horizontal plates extending longitudinally near the upper and lower margins thereof, said horizontal plates being tapered toward the end portions of the car, and angle-irons securing said horizontal and upright plates together.

10. A door for dump cars composed of an upright plate, horizontal plates extending longitudinally near the upper and lower margins thereof, said horizontal plates being tapered toward the end portions of the car and having oppositely-disposed angle-irons secured thereto at their outer margins, and angle-irons securing said horizontal and upright plates together.

11. A door for dump cars composed of an upright plate, horizontal plates extending longitudinally near the upper and lower margins thereof, angle-irons securing said horizontal and upright plates together, and vertically-disposed angle-irons secured at intervals at the outer sides of said vertical plates.

THOMAS R. McKNIGHT.

Witnesses:
WM. D. FOULKE,
M. A. SPERRY.